United States Patent
Fujikawa et al.

(10) Patent No.: US 12,213,417 B2
(45) Date of Patent: Feb. 4, 2025

(54) PLANT CONVEYANCE AND IRRADIATION APPARATUS

(71) Applicant: NICHIA CORPORATION, Anan (JP)

(72) Inventors: Yasuo Fujikawa, Yokohama (JP); Tomohiro Tsurumoto, Yokohama (JP); Hiroaki Tamemoto, Anan (JP)

(73) Assignee: NICHIA CORPORATION, Anan (JP)

( * ) Notice: Subject to any disclaimer, the term of this patent is extended or adjusted under 35 U.S.C. 154(b) by 147 days.

(21) Appl. No.: 17/624,647

(22) PCT Filed: Jul. 10, 2020

(86) PCT No.: PCT/JP2020/027084
§ 371 (c)(1),
(2) Date: Jan. 4, 2022

(87) PCT Pub. No.: WO2021/006342
PCT Pub. Date: Jan. 14, 2021

(65) Prior Publication Data
US 2022/0354063 A1     Nov. 10, 2022

(30) Foreign Application Priority Data
Jul. 10, 2019 (JP) .................. 2019-128643

(51) Int. Cl.
*A01G 7/04*     (2006.01)
*A01G 7/06*     (2006.01)

(52) U.S. Cl.
CPC .............. *A01G 7/045* (2013.01); *A01G 7/06* (2013.01)

(58) Field of Classification Search
CPC .......... A01G 7/045; A01G 7/06; A01G 31/02; A01G 31/04; A01G 31/047; A01G 31/00; A01G 7/00; A01G 9/247; A01G 9/249
See application file for complete search history.

(56) References Cited

U.S. PATENT DOCUMENTS 3,284,948 A * 11/1966 Kyle .................... A01G 31/042
                                                          47/65
2011/0010991 A1* 1/2011 Fujii .................... A01G 9/0295
                                                          47/85
(Continued)

FOREIGN PATENT DOCUMENTS

JP     2001-095383 A     4/2001
JP     2006-141236 A     6/2006
(Continued)

OTHER PUBLICATIONS

International Search Report dated Oct. 6, 2020 as issued in PCT Application No. PCT/JP2020/027084 (6 pages).

*Primary Examiner* — Brady W Frazier
*Assistant Examiner* — Spencer T Callaway
(74) *Attorney, Agent, or Firm* — Foley & Lardner LLP

(57) ABSTRACT

A plant treatment apparatus includes: a plant holding unit; an ultraviolet irradiation unit configured to irradiate a plant held by the plant holding unit with light comprising ultraviolet light in a wavelength range of no less than 270 nm and no more than 290 nm; and either (i) a plant immersion unit configured to immerse the plant held by the plant holding unit into a liquid that comprises water and is held by the plant immersion unit, or (ii) a liquid ejection unit that ejects the liquid towards the plant held by the plant holding unit.

17 Claims, 8 Drawing Sheets

(56) References Cited

U.S. PATENT DOCUMENTS

| | | | |
|---|---|---|---|
| 2011/0179706 A1* | 7/2011 | Hunt | A01G 7/045 |
| | | | 47/58.1 LS |
| 2013/0152864 A1* | 6/2013 | Grajcar | A01K 63/06 |
| | | | 362/101 |
| 2013/0323375 A1 | 12/2013 | Takahashi et al. | |
| 2014/0250778 A1* | 9/2014 | Suntych | C12M 31/02 |
| | | | 250/492.1 |
| 2015/0173379 A1 | 6/2015 | Lee et al. | |
| 2017/0055538 A1 | 3/2017 | Ohta et al. | |
| 2018/0132441 A1 | 5/2018 | Harker et al. | |
| 2018/0177034 A1* | 6/2018 | Saffari | A01G 7/045 |
| 2020/0060099 A1* | 2/2020 | Kim | H01L 33/32 |
| 2020/0288655 A1* | 9/2020 | Iwanaga | A01G 24/35 |
| 2021/0112726 A1 | 4/2021 | Okazawa et al. | |
| 2021/0315169 A1* | 10/2021 | Thomas | A01G 9/246 |
| 2021/0392832 A1* | 12/2021 | Benne | A01G 31/04 |

FOREIGN PATENT DOCUMENTS

| | | | |
|---|---|---|---|
| JP | 2006-141237 A | 6/2006 | |
| JP | 2007-089430 A | 4/2007 | |
| JP | 2011-097900 A | 5/2011 | |
| JP | 2012-010651 A | 1/2012 | |
| JP | 2013-078296 A | 5/2013 | |
| JP | 2015-521046 A | 7/2015 | |
| JP | 2017-046629 A | 3/2017 | |
| JP | 2018-186802 A | 11/2018 | |
| KR | 10-2019-0025358 A | 3/2019 | |
| WO | WO-2006/009189 A1 | 1/2006 | |
| WO | WO-2006/009190 A1 | 1/2006 | |
| WO | WO-2012/060450 A1 | 5/2012 | |
| WO | WO-2015059752 A1 * | 4/2015 | A01G 31/00 |
| WO | WO-2018/199307 A1 | 11/2018 | |

\* cited by examiner

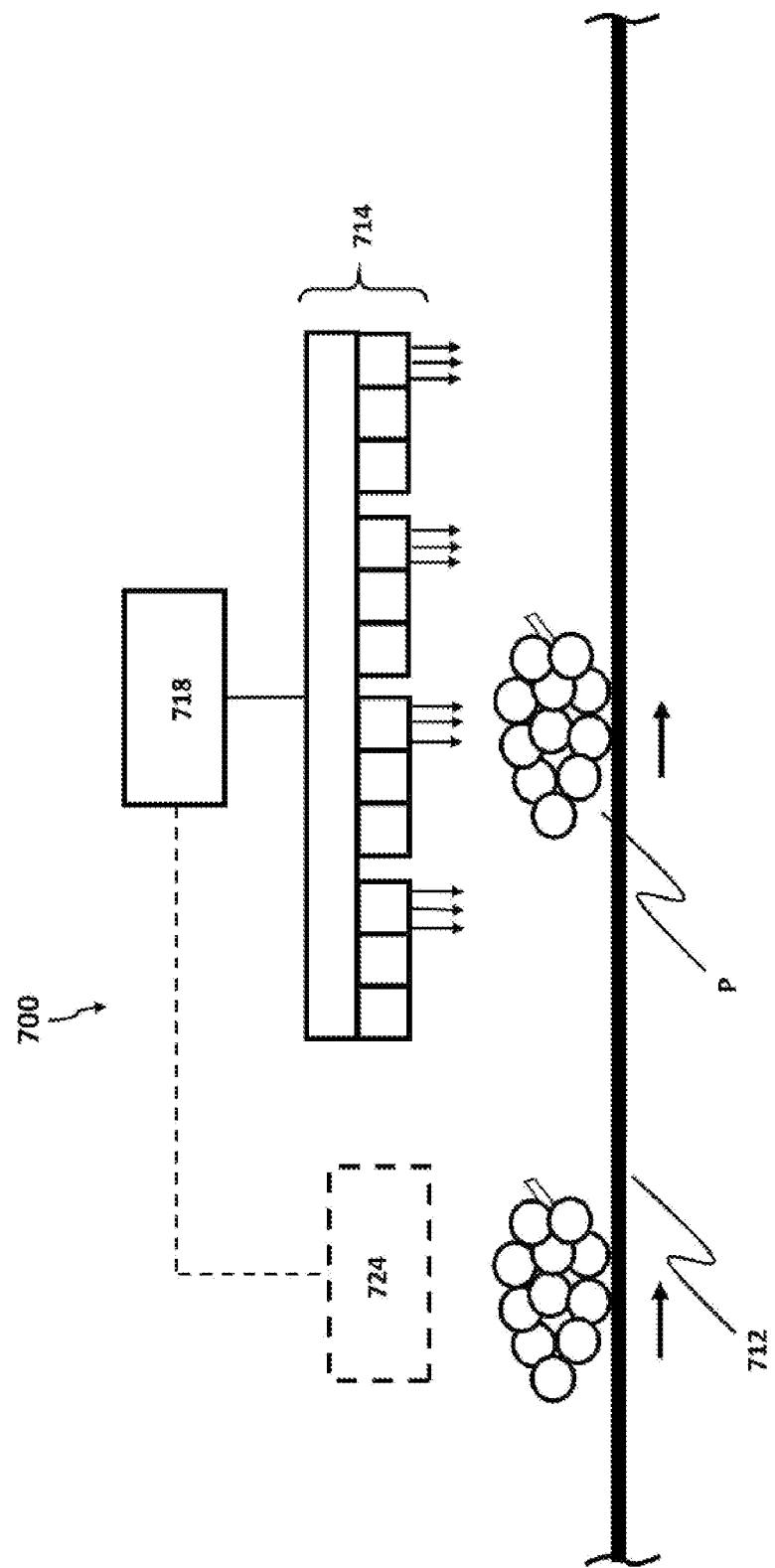

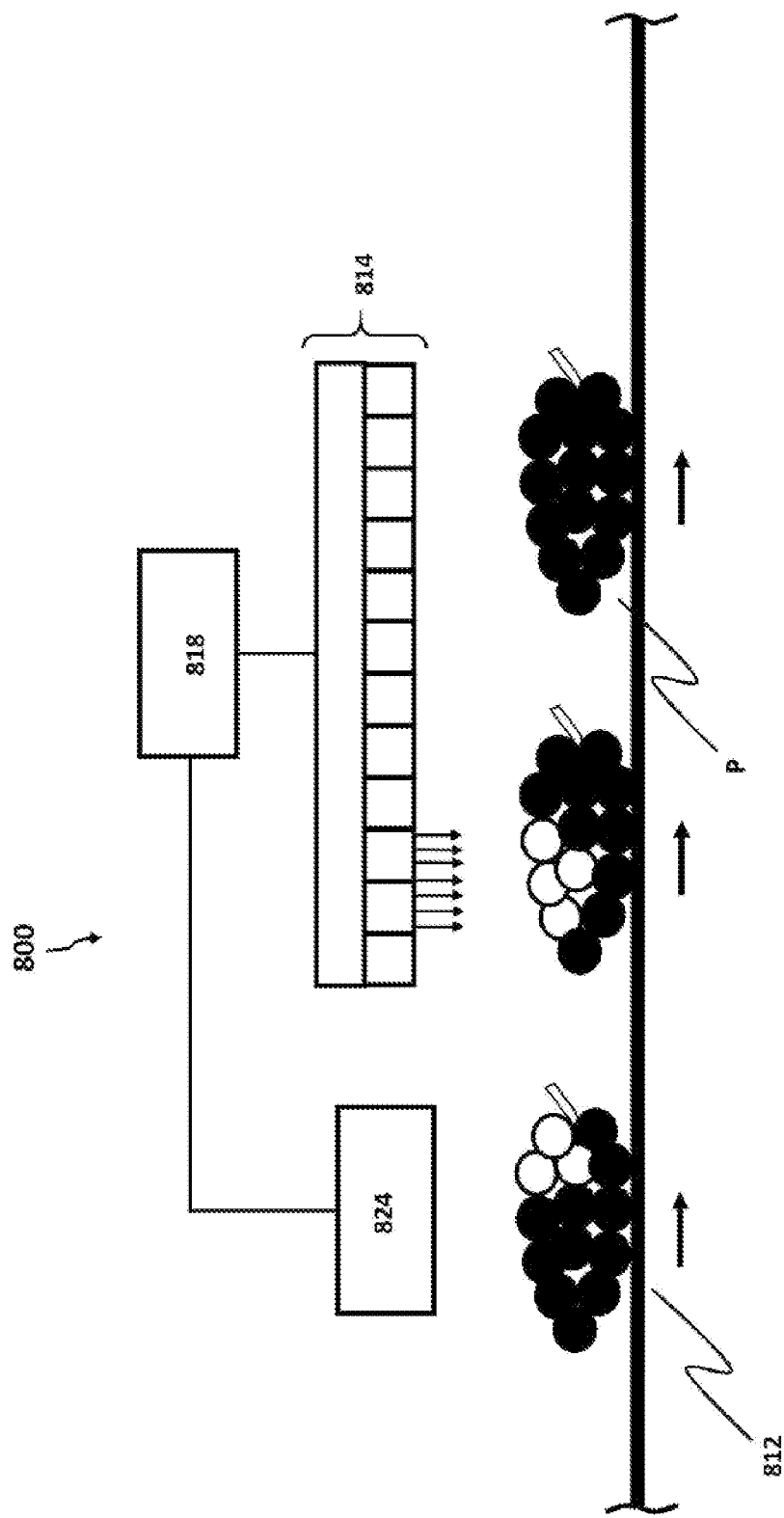

PLANT CONVEYANCE AND IRRADIATION APPARATUS

CROSS-REFERENCE TO RELATED APPLICATIONS

The present application is a National Phase of PCT Application No. PCT/JP2020/027084, filed on Jul. 10, 2020, which claims priority to Japanese Application No. 2019-128643, filed on Jul. 10, 2019. The contents of these application are hereby incorporated by reference in their entireties.

BACKGROUND

The present invention relates to an apparatus for treating plants, more specifically to an apparatus for irradiating ultraviolet light to subjecting plants.

Plant phenolic compounds (such as polyphenols) are found to have various physiological activities such as anti-oxidative activity, antibacterial activity and suppressive activity for blood pressure elevation, and are attracting significant attention coupled with recent rising concern about health. For example, anthocyanins and resveratrol are known to have antioxidative activity.

Anthocyanins are involved in coloration of plants.

Cannabinoids (terpene phenolic compounds in *Cannabis*) are used as starting materials of pharmaceuticals.

Thus, techniques for increasing the amount of phenolic compounds in plants have been developed.

For example, WO2018/199307 discloses a method for efficiently increasing the amount of phenolic compounds in a plant by irradiating the plant with an ultraviolet light in a specific wavelength range (no less than 270 nm and no more than 290 nm).

SUMMARY

In order to apply the method disclosed in WO2018/199307 at an industrial scale, there is a need for development of an apparatus that can treat many plants and can efficiently irradiate each plant with an ultraviolet light.

In a first aspect of the present invention, a plant treatment apparatus (hereinafter also referred to as the "apparatus according to the first aspect") includes: a plant holding unit capable of holding a plant; an ultraviolet irradiation unit to irradiate the plant held by the plant holding unit with light including an ultraviolet light in a wavelength range of no less than 270 nm and no more than 290 nm; and a plant immersion unit to immerse the plant held by the plant holding unit into a liquid held by the plant immersion unit, or a liquid ejection unit to eject the liquid towards the plant held by the plant holding unit. The liquid includes water.

In a second aspect of the present invention, a plant treatment apparatus (hereinafter also referred to as the "apparatus according to the second aspect") includes: a plant holding unit capable of holding a plant; an ultraviolet irradiation unit to irradiate the plant held by the plant holding unit with light including an ultraviolet light in a wavelength range of no less than 270 nm and no more than 290 nm; and an irradiation control unit to control at least one of an irradiation amount and a wavelength of the ultraviolet light and a position irradiated with the ultraviolet light on a basis of color information of the plant.

The apparatuses according to the first and second aspects of the present invention (hereinafter also collectively referred to as the "apparatus of the present invention") can treat many plants and, at the same time, can efficiently irradiate each plant with an ultraviolet light.

BRIEF DESCRIPTION OF THE DRAWINGS

FIG. 7 illustrates Embodiment 7 of an apparatus according to the second aspect of the present invention.

FIG. 8 illustrates Embodiment 8 of an apparatus according to the second aspect of the present invention.

DETAILED DESCRIPTION

Apparatus According to the First Aspect

Figure 1:
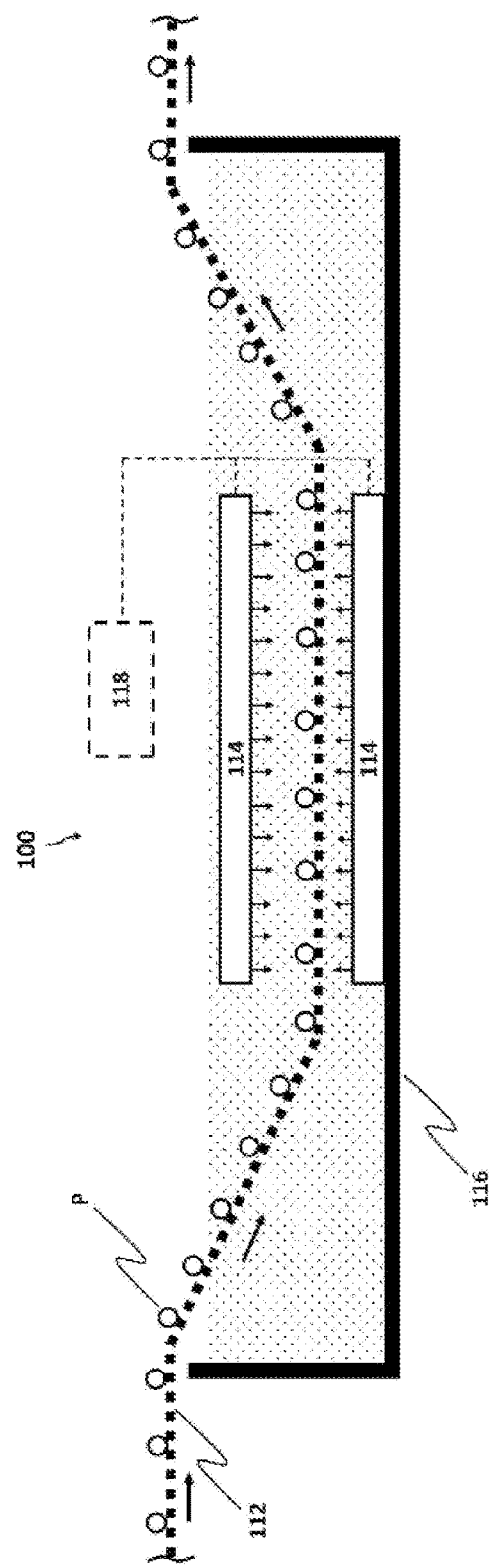
FIG. 1 illustrates Embodiment 1 of an apparatus according to the first aspect of the present invention.

The apparatus according to the first aspect of the present invention is a plant treatment apparatus including: a plant holding unit capable of holding a plant; an ultraviolet irradiation unit to irradiate the plant held by the plant holding unit with light including an ultraviolet light in a wavelength range of no less than 270 nm and no more than 290 nm (hereinafter also referred to as the "ultraviolet light in the specific wavelength range"); and a plant immersion unit to immerse the plant held by the plant holding unit into a liquid held by the plant immersion unit, or a liquid ejection unit to eject the liquid towards the plant held by the plant holding unit. The liquid includes water.

Immersing the plant held by the plant holding unit (namely, plant to be treated) in the liquid including water, or ejecting the liquid towards the plant, before, during and/or after irradiation with the ultraviolet light in the specific wavelength range, can prevent or suppress an increase in temperature of the plant due to irradiation, and/or decrease the increased temperature of the irradiated plant, thereby allowing continuous or short-interval intermittent irradiation of the plant with the ultraviolet light in the specific wavelength range. As a result, the plant treatment efficiency can be increased. In addition, the plants can be prevented from being dried and preserve freshness thereof.

Plant Holding Unit

The plant holding unit is capable of holding a plant.

The plant holding unit may have any structure capable of holding a plant (the whole plant or a part(s) or cell(s) thereof). The plant holding unit can hold a plant in any manner without particular limitation, and may hold a plant by placing it thereon, accommodating it therein, or clamping or gripping it. The plant holding unit does not necessarily directly support the plant, and may indirectly support the plant. For example, the plant holding unit may be a vessel to hold therein the plant suspended in a liquid (particularly in a water stream) or in a gas stream.

In some embodiments, the plant holding unit has a structure and size sufficient to place the plant thereon. The placement plane of such a plant holding unit (plant placement unit) may be formed with at least a part of, for example, a top surface of a floor, shelf or table, or an inner bottom surface of a vessel, tray or basket. The placement plane is not limited to one continuous plane, and may be formed with multiple separate planes or may be an imaginary plane such as a top surface of, for example, a mesh or grid panel. The shape of the plant placement unit is not particularly limited.

In some other embodiments, the plant holding unit has a structure and size sufficient to accommodate the plant therein. The shape of such a plant holding unit (plant accommodating vessel) is not particularly limited. The plant accommodating vessel may also serve as a storage or depot (including a large one at collection stations or a small one in the backyard of shops). The plant accommodating vessel may be stationary or may be movable or transportable (such as a transport container or a cargo chamber of a cargo vehicle). This makes it possible to subject the plant to a treatment (e.g., for increasing the amount of a phenolic compound) during transfer or transportation, and thus the time efficiency can be improved, resulting in improved freshness of the treated plant. The plant accommodating vessel may be provided with an atmosphere control mechanism to control the temperature and/or humidity of the inner atmosphere. In the case in which the plant is in the form of cells, the plant accommodating vessel may be a culture vessel.

In the case in which the plant holding unit is a vessel capable of holding the plant therein in a liquid, it may also serve as a liquid holding space of the plant immersion unit.

If the plant holding unit is located at a position to hinder the irradiation of the ultraviolet light in the specific wavelength range from the ultraviolet irradiation unit to the plant held by the plant holding unit, a member constituting the plant holding unit is preferably made of a material that is substantially transparent to an ultraviolet light in a wavelength range of no less than 270 nm and no more than 290 nm, or preferably has one or more openings (such as a mesh structure) that pass through the ultraviolet light. The phrase "substantially transparent to an ultraviolet light in a wavelength range of no less than 270 nm and no more than 290 nm" means that 50% or more, such as 60% or more, preferably 70% or more, more preferably 80% or more and more preferably 90% or more, of the ultraviolet light can be transmitted. Therefore, the plant holding unit may have, for example, a mesh-like or grid-like placement surface and/or wall.

The plant holding unit may form a part of a plant transportation mechanism to transport the plant to an irradiation region of the ultraviolet irradiation unit, and a liquid holding space of the plant immersion unit or an ejection region of the liquid ejection unit. This makes it to possible to continuously treat a large amount of plants. The plant transportation mechanism may mechanically transport the plant or transport the plant by means of water flow or gas flow.

For example, the plant holding unit has a structure having a top surface of a mesh conveyor provided so that at least a section thereof passes through a liquid holding space of the plant immersion unit or an ejection region of the liquid ejection unit.

The plant holding unit may include a plant displacement mechanism to displace the plant held thereby so as to shift a light receiving region in the plant where the ultraviolet light emitted from the ultraviolet irradiation unit is received. This makes it possible to increase the light receiving region receiving the ultraviolet light in the specific wavelength range in the plant held by the plant holding unit. Even if the plant is irradiated with the ultraviolet light in the specific wavelength range only from one direction (such as from above), the entire surface of the plant may be a light receiving region. Consequently, the apparatus of this embodiment can efficiently irradiate individual plants with the ultraviolet light and therefore, for example, can efficiently increase the amount of a phenolic compound in the plant.

The plant displacement mechanism may displace the plant by vibration, tilt or rotation, by flow (gas flow or water flow), and/or by mechanical contact. The plant displacement mechanism may have a structure including, for example, a baffle plate, a flow generation mechanism (such as a flow generation mechanism having a screw, a fan, or a liquid or air jet nozzle (collectively referred to as a "fluid jet nozzle")), a vibrating member to vibrate the plant holding unit, a rocking member to rock the plant holding unit, a tilting member to tilt the plant holding unit, a roller member to rotate the plant by contact with the same, or the like.

A specific example of the plant holding unit having the plant displacement mechanism is one having a rotary drum that is rotatably supported around a horizontal or inclined axis as a rotation axis. The rotary drum may have a baffle plate provided on an inner circumferential wall thereof. The baffle plate provided can promote the displacement of the plant in the drum. For example, the rotary drum may be rotated by a driving mechanism to rotate the rotation axis or by a driving mechanism to rotate a roller abutting against the outer circumference of the drum.

The plant holding unit is capable of holding a plant while being substantially light shielded (more preferably light shielded) preferably at least during ultraviolet irradiation, more preferably at least during and after ultraviolet irradiation. As used herein, "substantially light shield" means that the photosynthetic photon flux density is at a level at which photosynthesis does not occur in the subject plant to be irradiated, and more specifically that the photosynthetic photon flux density is ≤10 µmol/m$^2$/s, and "light shield" means that light is shielded, other than the light from the ultraviolet irradiation unit.

Thus, the plant holding unit may be provided in a light-shielding or substantially light-shielding housing (if provided) of the apparatus of the present invention, or may be a light-shielding or substantially light-shielding plant accommodating vessel. Alternatively, the plant holding unit may be configured to be transported through a path, at least a section of which is light shielded or substantially light shielded.

By holding the plant while being light shielded or substantially light shielded at least during ultraviolet irradiation, photosynthesis in the plant can be substantially prevented to avoid energy consumption by photosynthesis and activation of other synthesis systems. As a result, the effect of irradiation of the ultraviolet light in the specific wavelength range using the present apparatus (such as increasing the amount of a phenolic compound in the plant) can be more efficiently achieved.

Ultraviolet Irradiation Unit

The ultraviolet irradiation unit irradiates the plant held by the plant holding unit (also referred to as "the subject plant to be irradiated" in the section "Ultraviolet irradiation unit") with light including an ultraviolet light in a wavelength range of no less than 270 nm and no more than 290 nm.

The ultraviolet irradiation unit includes at least one light source that emits at least the ultraviolet light in the specific wavelength range. Examples of such a light source may include light-emitting diodes (LED), laser diodes (LD), xenon lamps, fluorescent lamps, incandescent lamps, metal halide lamps and high-pressure mercury lamps. The ultraviolet irradiation unit may have a filter having a transmittance that is higher for light in a wavelength range of no less than 270 nm and no more than 290 nm, than for light in a wavelength range of no less than 200 nm and no more than 260 nm and/or in a wavelength range of no less than 310 nm and no more than 400 nm.

In view of adverse effects on plants (such as cell damage), the ultraviolet irradiation unit preferably irradiates light in a wavelength range of no less than 200 nm and no more than 260 nm at an irradiation amount that is less than 20%, more preferably less than 10%, still more preferably less than 5% and the most preferably less than 1%, of the irradiation amount of the ultraviolet light in the specific wavelength range.

The light in a wavelength range of no less than 310 nm and no more than 400 nm does not contribute to an increase in the amount of a phenolic compound in plants, and rather may cause damage to plants. Therefore, in the case in which the present apparatus is used to increase the amount of a phenolic compound in the plant, the ultraviolet irradiation unit preferably irradiates light in a wavelength range of no less than 310 nm and no more than 400 nm at an irradiation amount that is less than 50%, more preferably less than 40%, more preferably less than 30%, more preferably less than 20%, more preferably less than 10% and the most preferably less than 5%, of the irradiation amount of the ultraviolet light in the specific wavelength range.

The irradiation amount of the plant with the ultraviolet light in the specific wavelength range may be set, for example, 1,500 $\mu mol/m^2$ or more and 1,000,000 $\mu mol/m^2$ or less, more preferably 1,500 $\mu mol/m^2$ or more and 50,000 $\mu mol/m^2$ or less.

The ultraviolet light in the specific wavelength range is irradiated at a photon flux density of, for example, 0.01 $\mu mol/m^2/s$ or more and 1,000 $\mu mol/m^2/s$ or less, and more specifically 0.01 $\mu mol/m^2/s$ or more and 100 $\mu mol/m^2/s$ or less. In the case in which the photon flux density is less than 0.01 $\mu mol/m^2/s$, it may not be possible to sufficiently obtain the effect of irradiation with the ultraviolet light in the specific wavelength range, for example, an increase in the amount of a phenolic compound in the plant. In the case in which the photon flux density is more than 1,000 $\mu mol/m^2/s$, plant damage may be induced quickly. The ultraviolet light in the specific wavelength range is irradiated at a photon flux density of preferably 0.1 $\mu mol/m^2/s$ or more and 20 $\mu mol/m^2/s$ or less, and more preferably 1 $\mu mol/m^2/s$ or more and 5 $\mu mol/m^2/s$ or less.

The light source to emit the ultraviolet light in the specific wavelength range is particularly preferably a light-emitting diode (LED) or a laser diode (LD). In the case in which an LED or LD is used, it is easy to achieve the irradiation of the plant with light in a wavelength range that is useful (e.g., for increasing the amount of a phenolic compound in the plant), while avoiding the irradiation of the plant with light in a wavelength range that is not useful (e.g., for increasing the amount of the phenolic compound in the plant), and may be rather nothing but harmful. That is, selective irradiation is easier. In view of energy efficiency and economic efficiency, use of an LED or LD is also preferable due to energy intensiveness, low heat generation, low power consumption and long life. In addition, the illuminance or the irradiation amount can be easily controlled or managed.

The ultraviolet irradiation unit may have two or more light sources with mutually different main peak wavelengths in a wavelength range of no less than 270 nm and no more than 290 nm. By having two or more light sources with mutually different main peak wavelengths, the ultraviolet irradiation unit can irradiate the plant with ultraviolet light at a wavelength more suitable for a treatment of the plant according to the type and/or condition of the plant, and for example, it can irradiate the plant with ultraviolet light at a wavelength that can more efficiently (in terms of energy efficiency and/or cell damage) increase the amount of a phenolic compound in the plant.

The light source is in any form and may be appropriately designed according to the size of the region to be irradiated and/or the arrangement of the intended region and the light source. The ultraviolet irradiation unit may have a structure including an array, matrix or cluster of light sources. In this case, the light sources forming the array, matrix or cluster may be controlled, individually or line by line, for turning on and off and/or the illuminance.

The light sources form the array, matrix or cluster may be controlled on the basis of information associated with the subject plant to be irradiated. The information associated with the subject plant to be irradiated may be color information of the plant, or the color information and positional information associated with the color information.

The light source included in the ultraviolet irradiation unit may be disposed at an arbitrary position that enables the irradiation of the plant held by the plant holding unit with the ultraviolet light in the specific wavelength emitted from the ultraviolet irradiation unit when the plant holding member is at a predetermined position. In the case in which the plant is held in a vessel, the light source may be provided in the vessel or outside thereof (if the vessel is made of a material substantially transparent to ultraviolet light in a wavelength range of no less than 270 nm and no more than 290 nm). In the case in which the plant holding unit is a rotary drum for example, (the light source of) the ultraviolet irradiation unit may be provided in the rotary drum to irradiate the ultraviolet light in the specific wavelength range to a lower region in the rotary drum. In the case in which the plant is held in a mesh-like vessel (such as a basket) for example, the light source may be provided inside and/or outside of the mesh-like vessel.

As long as the ultraviolet irradiation unit can irradiate the subject plant to be irradiated with the ultraviolet light in the specific wavelength range, it may irradiate the plant from any direction (one direction, or two or more directions) around the plant. The ultraviolet irradiation unit preferably irradiates the ultraviolet lights from two directions to the subject plant to be irradiated. Irradiation from two directions, particularly from opposing directions (such as the above and below, the left and right, or the front and back directions) allows efficient irradiation of a larger region of the subject plant to be irradiated with the ultraviolet light in the specific wavelength range.

Irradiation of the ultraviolet light in the specific wavelength range by the ultraviolet irradiation unit to the subject plant to be irradiated may be performed as continuous light or intermittent light or a combination thereof. The ultraviolet irradiation unit preferably irradiates the ultraviolet light in the specific wavelength range as intermittent light. Irradiation of intermittent light can avoid and/or reduce a rise in temperature of the subject plant to be irradiated and/or the light source. Specific examples of intermittent light have a pulse width of 100 ms or less, more specifically 50 ms or less, more specifically 20 ms or less, more specifically 10 ms or less and more specifically 5 ms or less, and a duty ratio of 50% or less, more specifically 40% or less, more specifically 30% or less, more specifically 20% or less, more specifically 10% or less and more specifically 5% or less.

The ultraviolet irradiation unit is preferably provided so that the irradiation region thereof overlaps with a liquid holding space of the plant immersion unit, or an ejection region of the liquid ejection unit, and more preferably irradiates the ultraviolet light in the specific wavelength range to the plant in the liquid holding space or in an atmosphere of liquid ejected by the liquid ejection unit. According to the preferable embodiments, the temperature rise of the plant under irradiation with the ultraviolet light in the specific wavelength range can be efficiently prevented or reduced, and therefore the plant may be irradiated with the ultraviolet light in the specific wavelength range continuously for a longer period or intermittently at a shorter interval. As a result, the use of the apparatus according to the present embodiment can further improve the treatment efficiency of the plant (such as production cycle time (time efficiency) of plants having an increased amount of a phenolic compound).

The illuminance and the irradiation time (or the irradiation amount) of the ultraviolet light in the specific wavelength range emitted from the ultraviolet irradiation unit may be controlled by, for example, a pulse width modulation circuit and/or a timer.

The ultraviolet irradiation unit may include any optical component such as a lens, a mirror reflector, a mask, a diffuser plate or the like.

The irradiation region of the ultraviolet irradiation unit is preferably substantially light shielded and is more preferably shielded from light.

Plant Immersion Unit

The plant immersion unit holds liquid including water and immerses the plant held by the plant holding unit in the liquid.

The plant immersion unit can hold or store a liquid, and may have any structure that allows to place the plant held by the plant holding unit, in the space for holding the liquid (liquid holding space). The liquid holding space of the plant immersion unit stores inside a liquid including water.

The plant immersion unit has a structure including, for example, a vessel or tank capable of holding a liquid.

A vessel that forms the plant holding unit and is capable of holding a plant therein in the liquid, or a part thereof (such as a lower region of the plant accommodating vessel) may also serve as the liquid holding space of the plant immersion unit.

The plant immersion unit may include a water flow generation mechanism capable of transporting the plant in a given direction, or suspending it, in the liquid.

The plant immersion unit may include a mechanism to introduce the plant held by the plant holding unit into the liquid holding space and/or remove it out from the liquid holding space. In the case in which the plant holding unit forms a part of a plant transportation mechanism, the function of such a mechanism may also be served by the plant transportation mechanism and a section thereof may pass through the liquid holding space of the plant immersion unit.

Liquid Ejection Unit

The liquid ejection unit ejects the liquid including water to the plant held by the plant holding unit.

The liquid ejection unit may have any structure capable of ejecting liquid to the plant held by the plant holding unit.

Ejection by the liquid ejection unit may be performed from any direction (one direction, or two or more directions) around the plant held by the plant holding unit, and is preferably performed from above the plant.

Ejection may be performed by using water pressure and/or air pressure. The ejection pattern (spray pattern) may be in any shape, and may be, for example, straight, fan-shaped (flat), or full cone-shaped. Ejection may be continuous or intermittent.

In the case in which the plant held by the plant holding unit is transported by a plant transportation mechanism, the ejection region of the liquid ejection unit may be provided at (at least a section of) the transport path of the plant transportation mechanism. In the case in which the plant is held in a vessel, the ejection region of the liquid ejection unit may be the entire inside of the vessel or a part thereof (such as a lower region of the plant accommodating vessel).

For example, the liquid ejection unit has one or more ejection ports to eject liquid towards the plant held by the plant holding unit. The ejection port is configured to be capable of ejecting liquid, or a mixture of liquid and gas. The ejection port is, for example, a single-fluid nozzle or a two-fluid nozzle.

The liquid ejection unit may eject a mist of liquid.

The liquid ejection unit may also serve as the plant displacement mechanism described above.

The liquid that includes water and is held by the liquid immersion unit or is ejected from the liquid ejection unit may be water, or water containing at least one substance selected from precursors of phenolic compounds and plant hormones. In case of the latter, biosynthesis (such as biosynthesis of phenolic compounds) may be facilitated in the plant, and thus the present apparatus can efficiently treat the plant so as to increase, for example, the amount of a phenolic compound in the plant.

Examples of the precursor substances include amino acids such as phenylalanine and tyrosine. Examples of the plant hormones include biosynthesis-promoting hormones and abscisic acid.

The liquid including water may contain an additive such as an alcohol for sterilization; a surfactant for improving water uptake; an acid, such as vinegar and citric acid, for antibacteria/bacteriostasis; a saccharide as an energy source; a vitamin; an inorganic salt or the like; or a plant senescence hormone inhibitor for preventing plant senescence.

Other Components

The apparatus according to the first aspect may further include an irradiation control unit to control at least one of the irradiation amount and the wavelength of the ultraviolet light in the specific wavelength range and the position to be irradiated with the ultraviolet light, on the basis of color information of the plant. The irradiation control unit is as described below for the apparatus according to the second aspect of the present invention.

It is intended that all the descriptions below for the apparatus according to the second aspect of the present invention are also applicable for the apparatus according to the first aspect of the present invention, unless the context clearly indicates that it is inappropriate to the latter.

Apparatus According to the Second Aspect

The apparatus according to the second aspect of the present invention is a plant treatment apparatus including: a plant holding unit capable of holding a plant; an ultraviolet irradiation unit to irradiate the plant held by the plant holding unit with light including an ultraviolet light in a wavelength range of no less than 270 nm and no more than 290 nm; and an irradiation control unit to control at least one of a irradiation amount and a wavelength of the ultraviolet light and a position to be irradiated with the ultraviolet light, on the basis of color information of the plant.

The plant holding unit in the apparatus according to the second aspect is as described for the apparatus according to the first aspect, except for inapplicable descriptions clearly indicated by the context.

The ultraviolet irradiation unit in the apparatus according to the second aspect is as described for the apparatus according to the first aspect, except for inapplicable descriptions clearly indicated by the context.

Irradiation Control Unit

The irradiation control unit controls at least one of the irradiation amount and the wavelength of the ultraviolet light in the specific wavelength range, irradiated from the ultraviolet irradiation unit, and the position to be irradiated with the ultraviolet light, to the plant held by the plant holding unit (also referred to as the "subject plant to be irradiated" in the section "irradiation control unit"), on the basis of color information of the subject plant. More specifically, the irradiation control unit can designate at least one light source that is intended to emit light from among multiple light sources (such as an array, matrix or cluster of light sources) in the ultraviolet irradiation unit, on the basis of the color information.

The color information may be input to the irradiation control unit by a user or may be transmitted from a color sensor that is external to, or included in the present apparatus. Alternatively, the color information may be input by reading a color information code pre-assigned to the plant. In addition to the color information, positional information associated with the color information may also be input to the irradiation control unit.

The color information preferably relates to green absorbance of the subject plant to be irradiated. Most of anthocyanins that may be present in plants have a maximum absorption at 280 nm. Therefore, if the subject plant to be irradiated has a high content of anthocyanins, the irradiated ultraviolet light in the specific wavelength range is absorbed by anthocyanins, and thus the irradiation effect of the ultraviolet light in the specific wavelength range may not be obtained in the plant (for example, the ultraviolet light may not contribute to an increased amount of a phenolic compound in the plant). In this view, the information on the anthocyanin content in the subject plant to be irradiated is useful to further ensure the irradiation effect of the ultraviolet light in the specific wavelength range on the plant (such as increase in the amount of a phenolic compound in the plant). Meanwhile, anthocyanins also have an absorption peak in the green wavelength range. Therefore, information on green absorption of the subject plant to be irradiated may reflect the amount of anthocyanins in the plant. Therefore, the color information relating to green absorption of the subject plant to be irradiated makes it possible to more-appropriately select at least one of irradiation amount and wavelength of the ultraviolet light in the specific wavelength range and position to be irradiated with the ultraviolet light for the irradiation effect of the ultraviolet light in the specific wavelength range (such as increase in the amount of a phenolic compound) in the plant, resulting in an improvement in energy efficiency of the plant treatment (such as treatment for increasing the amount of a phenolic compound in the plant) by the use of the present apparatus.

The irradiation control unit may control the ultraviolet irradiation unit or, if applicable, the plant transportation mechanism or both of the ultraviolet irradiation unit and the plant transportation mechanism. In the case in which the ultraviolet irradiation unit is configured to have multiple light sources, the irradiation control unit may control the multiple light sources collectively or may control each light source independently.

For example, the irradiation control unit controls so that a plant having higher green absorption is irradiated with the ultraviolet light in the specific wavelength range at a higher irradiation amount. Irradiation with the ultraviolet light in the specific wavelength range at a higher irradiation amount allows to achieve the irradiation effect of the ultraviolet light in the specific wavelength range on the plant (such as an increase in the amount of a phenolic compound in the plant) at a desired level even if some of the ultraviolet light is absorbed by anthocyanins. Control of the irradiation amount of the ultraviolet light in the specific wavelength range by the irradiation control unit can be achieved by controlling the ultraviolet irradiation unit and/or, if applicable, the plant transportation mechanism. Because the production cycle time is not affected, the irradiation control unit preferably controls the ultraviolet irradiation unit. In this preferable embodiment, the irradiation amount can be controlled by increasing/decreasing the illuminance of the light source included in the ultraviolet irradiation unit. In the case in which the ultraviolet irradiation unit is configured to have multiple light sources, the irradiation amount can be controlled by increasing or decreasing the illuminance and/or lighting time of each light source, and/or increasing or decreasing the number of light sources that are turned on.

For example, the irradiation control unit controls so that a plant having higher green absorption is irradiated with ultraviolet light having a longer wavelength in the wavelength range of no less than 270 nm and no more than 290 nm. Irradiation with ultraviolet light having a longer wavelength can efficiently achieve the irradiation effect of the ultraviolet light in the specific wavelength range on the plant (such as an increase in the amount of a phenolic compound) while avoiding cell damage (such as DNA damage) due to light with a shorter wavelength. In this embodiment, among two or more types (specifically two or three types) of light sources included in the ultraviolet irradiation unit, the two or more types of light sources having mutually different main peak wavelengths in the wavelength range of no less than 270 nm and no more than 290 nm, the irradiation control unit can designate one type (or two or three types) of light sources to emit light on the basis of the color information.

In this example, the irradiation control unit may control both wavelength and irradiation amount of the ultraviolet light in the specific wavelength range.

For example, the irradiation control unit controls so that a plant or a region thereof having a green absorption lower than a given level is irradiated with the ultraviolet light in the specific wavelength range. This makes it possible to increase the amount of a phenolic compound on an individual plant basis, or on a region basis in an individual plant, thereby increasing energy efficiency due to reduction of unnecessary irradiation and allowing to equalize the quality (such as quality associated with the amount of a phenolic compound, more specifically, color) of the treated plants. As a result, low grade- or shipping ineligible-agricultural crops can be reduced and yield rate of agricultural crops can be increased. In this embodiment, the irradiation control unit can designate a light source to emit light on the basis of color information and positional information associated with the color information.

Color Sensor

The apparatus according to the second aspect preferably further includes a color sensor to acquire color information of the plant held by the plant holding unit and transmit the acquired color information to the irradiation control unit. In this case, the plant holding unit more preferably forms a part of a plant transportation mechanism to transport the plant held by the plant holding unit to a sensing region of the color sensor and an irradiation region of the ultraviolet irradiation unit.

This makes it possible to select plants to be treated with ultraviolet irradiation (such as plants whose phenolic compound content is to be increased) by using the present apparatus, and/or determine at least one of the irradiation amount, wavelength and irradiation position of the intended ultraviolet light in the specific wavelength range on the basis of color information of the plant.

The color sensor acquires intensity information of at least one of the RGB (red, green and blue) components of the light received and outputs the acquired intensity information to the irradiation control unit. The color sensor may be a multi-color sensor or a single-color sensor, and can preferably sense green. The color sensor can be, for example, a photodiode, a photomultiplier, a CCD sensor, a CMOS sensor or the like. In the case in which a two-dimensional color sensor (such as a CCD sensor or a CMOS sensor) is used, color information as well as positional information associated with the color information can be obtained.

Other Components

The apparatus according to the second aspect may further include a plant immersion unit to hold liquid including water and immerse the plant held by the plant holding unit in the liquid, or a liquid ejection unit to eject the liquid to the plant held by the plant holding unit. The plant immersion unit and the liquid ejection unit are as described above for the apparatus according to the first aspect of the present invention.

It is intended that all the descriptions above for the apparatus according to the first aspect are also applied to the apparatus according to the second aspect, unless the context clearly indicates that it is inappropriate to the latter.

Phenolic Compounds

As used herein, the phenolic compound is not particularly limited as long as it can be naturally synthesized in the plant used, and may be, for example, a phenylpropanoid, a polyphenol or a terpene phenol.

Examples of polyphenols include flavonoids, stilbenoids, tannins and lignans. Examples of flavonoids include anthocyanins, flavans (such as catechins), flavones, isoflavones and flavonols. Examples of stilbenoids include resveratrol.

Examples of terpene phenols include cannabinoids. Examples of cannabinoids include tetrahydrocannabinols and cannabidiols.

Anthocyanins are glycosides where anthocyanidins are bound to a sugar chain(s) (such as glucose, galactose or rhamnose). Examples of anthocyanidins that are commonly found in plants include pelargonidin, cyanidin, peonidin, delphinidin, petunidin and malvidin. Anthocyanins are pigments widely present in the plant kingdom, which produce colors in the range from red to violet to blue, used as plant-based colorants (e.g., for food products) and are known to be antioxidants. Therefore, an anthocyanin is a preferable phenolic compound that is sought to be increased in a plant using the apparatus of the present invention.

Resveratrol is a phytoalexin and is also known as an antioxidant, and various biological effects thereof have been reported. Therefore, resveratrol is a preferable phenolic compound that is sought to be increased in a plant using the apparatus of the present invention.

Cannabinoids are bioactive substances in *Cannabis* and are used for medical purposes. Therefore, a cannabinoid is a preferable phenolic compound that is sought to be increased in a plant using the apparatus of the present invention.

As used herein, the expression "increasing the amount of a phenolic compound" refers to an increase in the amount of a phenolic compound by, for example, 10% or more, preferably 20% or more, more preferably 50% or more, and more preferably 100% or more, compared to such a plant that has not been irradiated with the ultraviolet light in the specific wavelength range (but exclude a component contained in sunlight). The expression "increasing the amount of a phenolic compound" also includes a new synthesis found after irradiation of a phenolic compound that was not synthesized before irradiation.

The phenolic compound may be quantified by any known method, for example, by chromatography. Examples of chromatography include liquid chromatography (such as HPLC). Liquid chromatography may be reverse-phase chromatography.

(Plants)

As used herein, the plant is not particularly limited as long as it can produce a phenolic compound. The plant having, for example, the UVR8 photoreceptor can be applied.

The plant may be a vegetable, a fruit tree, a flowering plant or a herb. Examples of such plants include plants belonging to the families Brassicaceae (particularly, the genera *Brassica* and *Raphanus*), Solanaceae (particularly, the genus *Solanum*), Berberidaceae (particularly, the genus *Podophyllum*), Theaceae (particularly, the genus *Camellia*), Fabaceae (particularly, the genus *Glycine*), Rutaceae (particularly, the genus *Citrus*), Vitaceae (particularly, the genus *Vitis*), Rosaceae (particularly, the genus *Fragaria*), Astraceae (particularly, the genus *Lactuca*), Lamiaceae (particularly, the genus *Perilla*) or Cannabaceae (particularly, the genus *Cannabis*). Specific examples include *Vitis* spp., *Cannabis*, cherry (such as Prunus avium and Prunus cerasus), *Amygdalus persica, Malus pumila*, strawberry (such as *Fragaria×ananassa*Duchesne ex Rozier), *Camellia sinensis, Lactuca sativa* (such as *Lactuca sativa* var. *crispa*), *Perilla frutescens* var. *crispa* (such as *Perilla frutescens* var. *crispa f. purpurea*), *Podophyllum peltatum, Glycin max, Citrus sudachi, Brassica oleracea* var. *capitata, Brassica oleracea* var. *italica, Brassica rapa* var. *perviridis, Brassica rapa* var. *chinensis, Raphanus sativus* var. *hortensis, Brassica rapa* subsp. *rapa, Solanum lycopersicum, Solanum melongena* and *Arabidopsis*.

The plant may be a harvested whole plant, or a part thereof, or a cell from the part, as long as the synthesis system of phenolic compounds works therein. The plant part may be, for example, a leaf, a stem, a fruit, a pericarp, a petal or corolla, or a part having trichomes. An appropriate part, with high capability of synthesizing a desired phenolic compound, of a plant in which the amount of said phenolic compound is sought to be increased, can be selected and used in the apparatus of the present invention.

An embodiment of a plant wherein the amount of an anthocyanin or resveratrol may be increased is grape berry and/or skin, or a cell therefrom. An embodiment of a plant wherein the amount of a cannabinoid may be increased is *Cannabis* leaf and/or corolla.

In the case in which the plant wherein the amount of a phenolic compound is increased by the apparatus of the present invention is used as a raw material of, for example, a medicament or supplement, or a high value-added and/or highly functional, processed food, the plant to be used in the apparatus of the present invention may be cut or broken into smaller pieces, pulverized or crushed as long as the synthesis system of phenolic compounds works therein. Alternatively, a cell may be derived from a plant body by using tissue culture technique. These make it possible to enlarge the light receiving surface of the plant receiving the ultraviolet light in the specific wavelength range and/or process a large amount of plants, thereby more efficiently increasing the amount of the phenolic compound. For grapes used for making wine, for example, the berries may be individually separated by a destemmer, or further only the berry skins may be obtained therefrom to be used to increase the amount of an anthocyanin or resveratrol by using the apparatus of the present invention. For *Cannabis* used for obtaining a pharmaceutical raw material, for example, harvested corollas and leaves may be cut into small pieces to be used to increase the amount of a cannabinoid by using the apparatus of the present invention.

The plant per se, in which the amount of a phenolic compound is increased by using the apparatus of the present invention, may also be provided as a high value-added and/or highly functional agricultural crop.

In order to efficiently achieve an increase in the amount of a phenolic compound in a plant by using the apparatus of the present invention, it is preferable to use a fresh plant, although not necessary. The freshness of a plant suitable for the apparatus of the present invention may be evaluated from the following points.

(1) Postharvest time: within two weeks, desirably within one week, more desirably within 24 hours and still more preferably within 12 hours of harvesting.

(2) Cut end color: no discoloration.

(3) Water transpiration (based on the weight): the percentage of change in weight from immediately after harvesting is 5% or less, desirably 1% or less.

(4) Chlorophyll degradation (based on chlorophyll content, fluorescence amount or photosynthetic yield): particularly suitable for plants (particularly, leaves) containing a high amount of chlorophyll such as leaf lettuce and *Cannabis*.

The percentage of change in chlorophyll content from immediately after harvesting, as measured using for example a chlorophyll content measuring instrument (DUALEX SCIENTIFIC+), is 5% or less, desirably 1% or less.

The percentage of change in photosynthetic yield from immediately after harvesting, as measured using for example a photosynthetic yield analyzer (MINI-PAM II), is 5% or less, desirably 1% or less.

(5) Sugar content and acidity: particularly suitable for fruit such as grape and apple pericarp.

The percentage of change in sugar content and acidity from immediately after harvesting, as measured using for example a sugar content/acidity meter, is within ±5%, desirably within ±1%.

(6) Vitamin C content: the percentage of change in vitamin C content from immediately after harvesting, as measured using the indophenol or xylene method, is 5% or less, desirably 1% or less.

(7) Respiration (carbon dioxide) level: the percentage of change in respiration (carbon dioxide) level from immediately after harvesting, as measured using gas chromatography or a $CO_2$ analyzer, is 5% or less, desirably 1% or less.

(8) Firmness: particularly suitable for fruit such as grape and apple pericarp.

The percentage of change in firmness from immediately after harvesting, as measured using a firmness meter, is 5% or less, desirably 1% or less.

When DNA is exposed to ultraviolet lights, two consecutive pyrimidine bases (C or T) will suffer a characteristic structural change (damage), resulting in the generation of mainly the cyclobutane pyrimidine dimers (CPDs) and the 6-4 photoproducts (6-4PPs). This structural change can be also found in open cultivated plants that have been exposed to the sun's ultraviolet light. The 6-4 photoproducts are converted to the Dewar photoproducts (Dewar PPs) when exposed to ultraviolet light on the long wavelength side (UVA: 320-400 nm), but are not converted when exposed to ultraviolet light on the short wavelength side, UVB. Therefore, it is possible to know whether or not a plant is exposed to UVA by using as an indicator, the Dewar PPs content, or the ratio of the 6-4PPs and CPDs content relative to the CPDs and Dewar PPs content.

Therefore, the plants irradiated with the ultraviolet light in the specific wavelength range used in the apparatus of the present invention (or the method disclosed in WO 2018/199307) are distinguishable from the plants irradiated with UVA in the following features; (i) in the former plant, no Dewar photoproduct is detected, or (ii) in the former plant, the content ratio (6-4 photoproducts/Dewar photoproducts) is for example 100 or more, desirably 1000 or more, or (iii) in the former plant, the content ratio (cyclobutane pyrimidine dimers/Dewar photoproducts) is 1000 or more, desirably 10000 or more. Said three types of photoproducts can be quantified by an assay using an antibody (anti-CPDs, anti-6-4 PPs and anti-Dewar PPs) (https://www.mabel.co.jp/products_services/reagents/mab/).

Damaged DNA is degraded by DNA degrading enzyme in saliva or digestive fluid, and thus it is believed that eating the damaged DNA would not affect the human body.

Specific Embodiments

The apparatus of the present invention is hereinafter described with reference to FIGS. 1 to 8, which schematically illustrate specific embodiments of the apparatus of the present invention.

Embodiment 1

FIG. 1 illustrates a specific embodiment of the apparatus according to the first aspect of the present invention. The present apparatus (100) includes: a belt conveyor (112), which forms the plant holding unit; two LED arrays (114), which form the ultraviolet irradiation unit; and an immersion vessel (116), which forms the plant immersion unit. It may include a controller (118) and a camera (not illustrated) as optional elements.

The belt portion of the belt conveyor (112) is a light-transmitting mesh or net belt. The belt conveyor (112) is provided so that a section thereof passes through the liquid holding space (the water when stored therein) of the immersion vessel (116).

Each of the LED arrays (114) includes LED light sources to emit the ultraviolet light in the specific wavelength range. As the LED light source to emit the ultraviolet light in the specific wavelength range, two or more light sources having mutually different main peak wavelengths in a wavelength range of no less than 270 nm and no more than 290 nm may be used.

The LED arrays (114) are arranged to irradiate the ultraviolet light in the specific wavelength range to the underwater section of the belt conveyor (112) from above and below. In other words, the ultraviolet irradiation regions of the LED arrays (114) overlap with the liquid holding space of the immersion vessel (116). In the figure, the LED arrays (114) are provided in the liquid holding space of the immersion vessel (116) (which means that they are under water when water is stored therein). However, the LED arrays may be provided outside of the liquid holding space of the immersion vessel (116) (which means that they are not under water when water is stored therein) as long as they can irradiate the ultraviolet light in the specific wavelength range to the plant (P).

The immersion vessel (116) is capable of holding liquid and stores water when used. Water may contain a plant hormone and/or any other additive added thereto. In the case in which the present apparatus is used to increase the amount of a phenolic compound in a plant, a precursor of the phenolic compound to be increased may be additionally or alternatively added.

The controller (118) may control the LED arrays (114) on the basis of entered color information of the plant (P). The controller (118) may collectively or individually control the LED light sources in the LED arrays (114).

The camera used is, for example, a CCD or CMOS camera, which is placed on an upstream side relative to the immersion vessel (116) in the course of the belt conveyor (112), acquires an image of the plant (P) on the belt conveyor (112), and sends the image data including color information of the subject plant (P) to the controller (118). An operator may enter color information of the plant (P) to the controller (118) without using a camera.

In the apparatus (100) of this embodiment, the plant (P) to be irradiated with the ultraviolet light in the specific wavelength range is placed on the top surface of the belt conveyor (112). The plant (P) held on the belt conveyor (112) is transported by the belt conveyor (112) to the immersion vessel (116), where the plant (P) is immersed in water. The plant (P) is then transported to the ultraviolet irradiation region provided in water, and is irradiated with the ultraviolet light in the specific wavelength range from the LED arrays (114) while being immersed in water. The LED arrays (114) may continuously or intermittently irradiate the plant (P) with the ultraviolet light in the specific wavelength range. The amount of irradiation from the LED arrays (114) to the plant (P) may be adjusted by the controller (118) controlling the turning on and off of, and/or the amount of light emitted from the LED light sources on the basis of the color information of the plant (P).

The belt conveyor (112) may be configured to form a loop and therefore the plant (P) may be irradiated again with the ultraviolet light from the LED arrays (114) in the immersion vessel (116). In an alternative configuration, LED arrays (114) and immersion vessels (116) are provided at two or more locations along the transport path of the belt conveyor (112).

Some plants float on or are suspended in water. Therefore, the section of the belt conveyor (112) in the immersion vessel (116) may be omitted, and the plant (P) dropped into the immersion vessel (116) from an upstream belt conveyor may be transported by water flow to the downstream side of the immersion vessel (116), whereby the plant (P) may be taken up from water with a downstream belt conveyor. In this case, the upper LED array (114) is arranged above the water level of the immersion vessel (116). A water jet port and a water intake port may be provided upstream and downstream, respectively, of the immersion vessel (116) so that water taken from the water intake port can be circulated to the water jet port. In the case in which the plant (P) is irregularly displaced in the immersion vessel (116) by water flow, in other words, in the case in which the light receiving surface of the plant (P) relative to the light irradiation direction irregularly changes, one of the upper and lower LED arrays (114) may be omitted.

Embodiment 2

Figure 2:
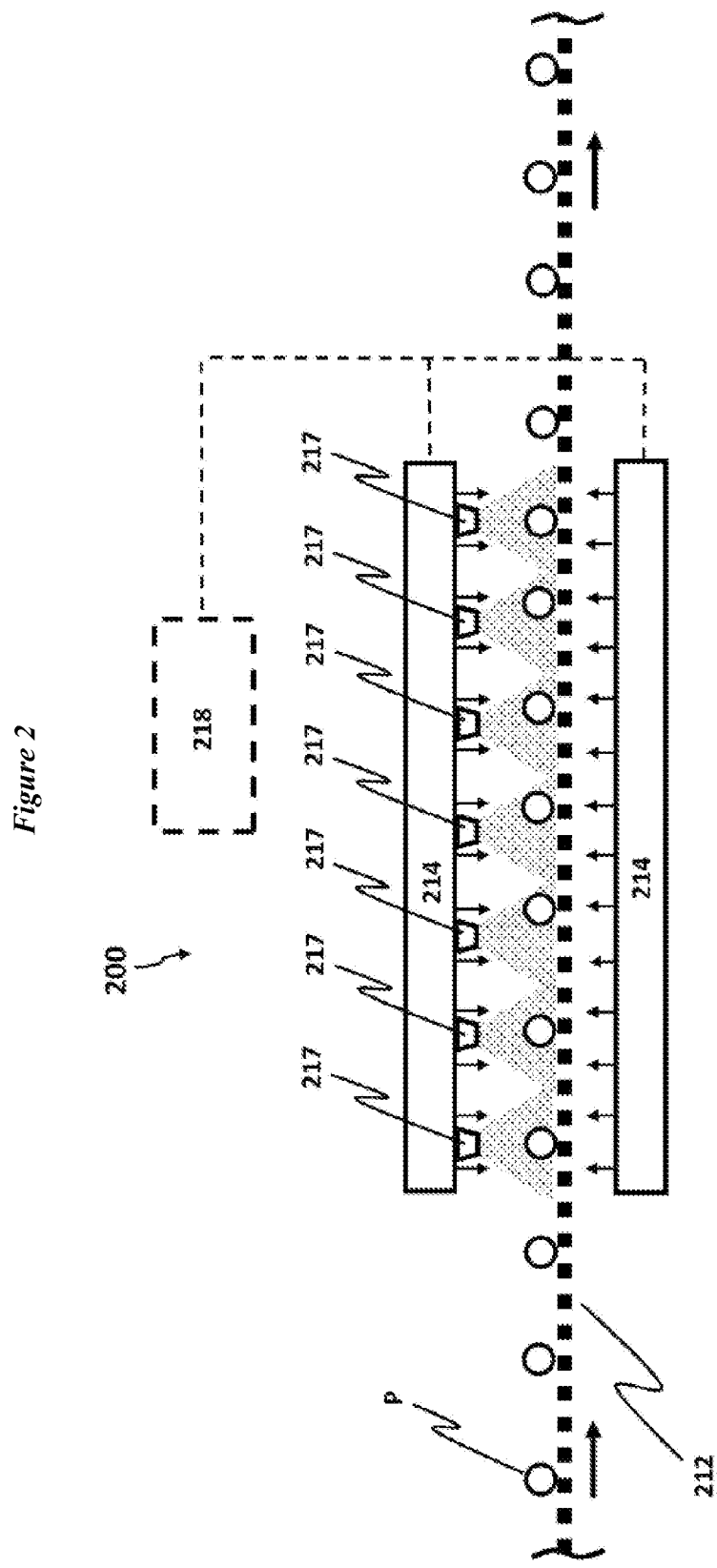
FIG. 2 illustrates Embodiment 2 of an apparatus according to the first aspect of the present invention.

FIG. 2 illustrates a specific embodiment of the apparatus according to the first aspect of the present invention. The present apparatus (200) includes: a belt conveyor (212), which forms the plant holding unit; two LED arrays (214), which form the ultraviolet irradiation unit; and a plurality of spray nozzles (217), which form the liquid ejection unit. It may include a controller (218) and a camera (not illustrated) as optional elements.

The belt portion of the belt conveyor (212) is a light-transmitting mesh or net belt. The belt conveyor (212) is provided so that a section thereof passes through the ejection regions of the spray nozzles (217).

Each of the LED arrays (214) includes LED light sources to emit the ultraviolet light in the specific wavelength range. As the LED light source to emit the ultraviolet light in the specific wavelength range, two or more light sources having mutually different main peak wavelengths in the wavelength range of no less than 270 nm and no more than 290 nm may be used.

The LED arrays (214) are arranged to irradiate the ultraviolet light in the specific wavelength range from above and below in a section of the belt conveyor (212).

Each of the spray nozzles (217) is capable of spraying a mist of liquid, and is, for example, a two-fluid nozzle. Each of the spray nozzles (217) is provided so that the spray region thereof overlaps with the ultraviolet irradiation region of the LED arrays (214). Water from a liquid supply system not illustrated in the figure is supplied to the spray nozzle (217), and if applicable, compressed air is also simultaneously supplied from an air supply system not illustrated in the figure. Water may contain a plant hormone and/or any other additive added thereto. In the case in which the present apparatus is used to increase the amount of a phenolic compound in a plant, a precursor of the phenolic compound to be increased may be additionally or alternatively added.

The controller (218) may control the LED array (214) on the basis of entered color information of the plant (P). The controller (218) may collectively or individually control the LED light sources in the LED array (214).

The camera used is, for example, a CCD or CMOS camera, which is placed on an upstream side relative to the LED arrays (214) in the course of the belt conveyor (212), acquires an image of the plant (P) on the belt conveyor (212), and sends the image data including color information of the subject plant (P) to the controller (218). An operator may enter color information of the plant (P) to the controller (218) without using a camera.

In the apparatus (200) of this embodiment, the plant (P) to be irradiated with the ultraviolet light in the specific wavelength range is placed on the top surface of the belt conveyor (212). The plant (P) held on the belt conveyor (112) is transported by the belt conveyor (212) to the ultraviolet irradiation region of the LED arrays (214), in which region it is irradiated with the ultraviolet light in the specific wavelength from the LED arrays (214) and simultaneously sprayed with water from the spray nozzle (217). The LED arrays (214) may continuously or intermittently irradiate the plant (P) with the ultraviolet light in the specific wavelength range. The amount of irradiation from the LED arrays (214) to the plant (P) may be adjusted by the controller (218) controlling the turning on and off of, and/or the amount of light emitted from the LED light sources on the basis of the color information of the plant (P).

The belt conveyor (212) may be configured to form a loop and therefore the plant (P) may be irradiated again with the ultraviolet light from the LED arrays (214). In an alternative configuration, LED arrays (214) and spray nozzles (214) are provided at two or more locations along the transport path of the belt conveyor (212).

Air may be intermittently ejected laterally to the plant (P). This makes it possible that the plant (P), if it is in a granular shape, rolls on the belt conveyor (212), thereby irregularly changing the light receiving surface of the plant (P) relative to the light irradiation direction, and therefore uniform irradiation of the surface of the plant (P) can be facilitated. In this case, the lower LED array (214) may be omitted.

Embodiment 3

Figure 3:
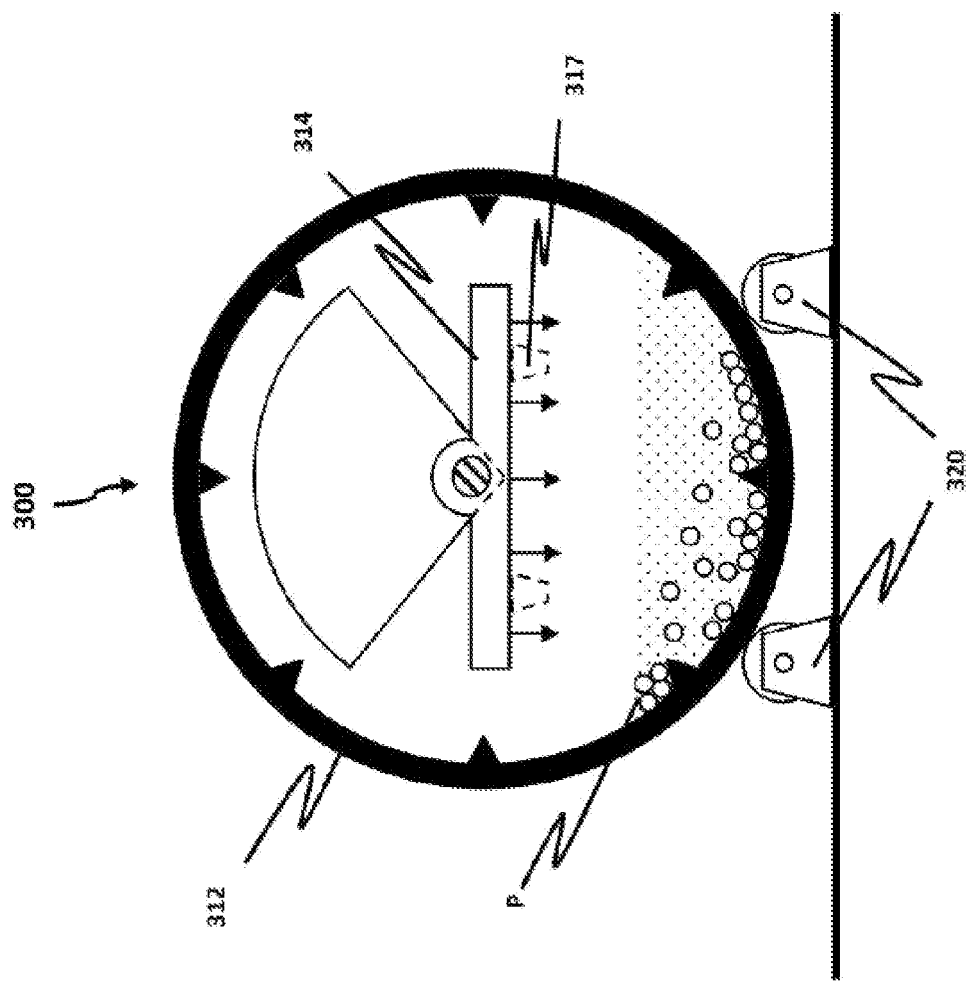
FIG. 3 illustrates Embodiment 3 of an apparatus according to the first aspect of the present invention.

FIG. 3 illustrates a specific embodiment of the apparatus according to the first aspect of the present invention. The present apparatus (300) includes: a rotary drum vessel (312), which is configured to serve as both the plant holding unit and the plant immersion unit; a roller (320) to rotate the vessel; and an LED array (314), which forms the ultraviolet irradiation unit. It may include a liquid ejection nozzle (317) as an optional element.

The rotary drum vessel (312) is a vessel capable of holding predefined amounts of plant and liquid therein and having a cylindrical external shape, and is supported rotatably around the horizontal axis. The rotary drum vessel (312) has an opening, through which the plant can be put in and out, and a lid to open and close the opening on one end side in the axis direction. In FIG. 3, the rotary drum vessel (312) has a baffle plate on the inner circumferential wall. In the case in which, for example, it has a polygonal inner shape on a cross section perpendicular to the horizontal axis, a baffle plate may not be provided.

The roller (320) is provided to abut on the outer circumference of the rotary drum vessel (312) so that the vessel is driven to rotate around the horizontal axis as the rotation axis.

The LED array (314) includes LED light sources to emit the ultraviolet light in the specific wavelength range. As the LED light source to emit the ultraviolet light in the specific wavelength range, two or more light sources having mutually different main peak wavelengths in the wavelength range of no less than 270 nm and no more than 290 nm may be used. The LED array (314) is arranged in the rotary drum vessel (312) to be able to irradiate the lower region in the vessel with the ultraviolet light in the specific wavelength range.

The ejection nozzle (317) is capable of ejecting liquid and may be capable of ejecting a mist of liquid. The ejection nozzle (317) is arranged in the rotary drum vessel (312) to be able to eject liquid to the lower region in the vessel. The ejection nozzle (317) may be provided so that the ejection region thereof overlaps with the ultraviolet irradiation region of the LED array (314). Water from a liquid supply system is supplied to the ejection nozzle not illustrated in the figure, and if applicable, compressed air is also simultaneously supplied from an air supply system (not illustrated in the figure). Water may contain a plant hormone and/or any other additive added thereto. In the case in which the present apparatus is used to increase the amount of a phenolic compound in a plant, a precursor of the phenolic compound to be increased may be additionally or alternatively added.

In the apparatus (300) of this embodiment, the plant (P) to be irradiated with the ultraviolet light in the specific wavelength range is accommodated in the rotary drum vessel (312) in the lower region. Before, upon or after placing the plant (P), water is supplied to the rotary drum vessel (312), thereby immersing the plant (P) in water in the lower region (liquid holding space). Water may contain a plant hormone and/or any other additive added thereto. In the case in which the present apparatus is used to increase the amount of a phenolic compound in the plant, a precursor of the phenolic compound to be increased may be additionally or alternatively added. Water may be supplied from the ejection nozzle (317).

In the lower region of the rotary drum vessel (312), the plant (P) is irradiated with the ultraviolet light in the specific wavelength range from the LED array (314) while being immersed in water. The LED array (314) may continuously or intermittently irradiate the plant (P) with the ultraviolet light in the specific wavelength range. The ejection nozzle (317) may eject water to the plant (P) under irradiation.

Alternatively, the plant (P) accommodated in the rotary drum vessel (312) may be irradiated with the ultraviolet light in the specific wavelength range by the LED array (314) without immersion in water, but with the ejection nozzle (317) ejecting water to the plant (P) under irradiation. In this case, the ejection nozzle (317) may be controlled by an ejection controller not illustrated in the figure, so that water is ejected until the plant (P) in the ultraviolet irradiation region of the LED array (314) is immersed in the water stored in the rotary drum vessel (312).

The apparatus (300) of the present embodiment may further include a controller (not illustrated in the figure) to collectively or individually control the LED light sources in the LED array (314). The controller may control the turning on and off of, and/or the amount of light emitted from the LED light sources to adjust the amount of irradiation from the LED array (314) to the plant (P).

Embodiment 4

Figure 4:
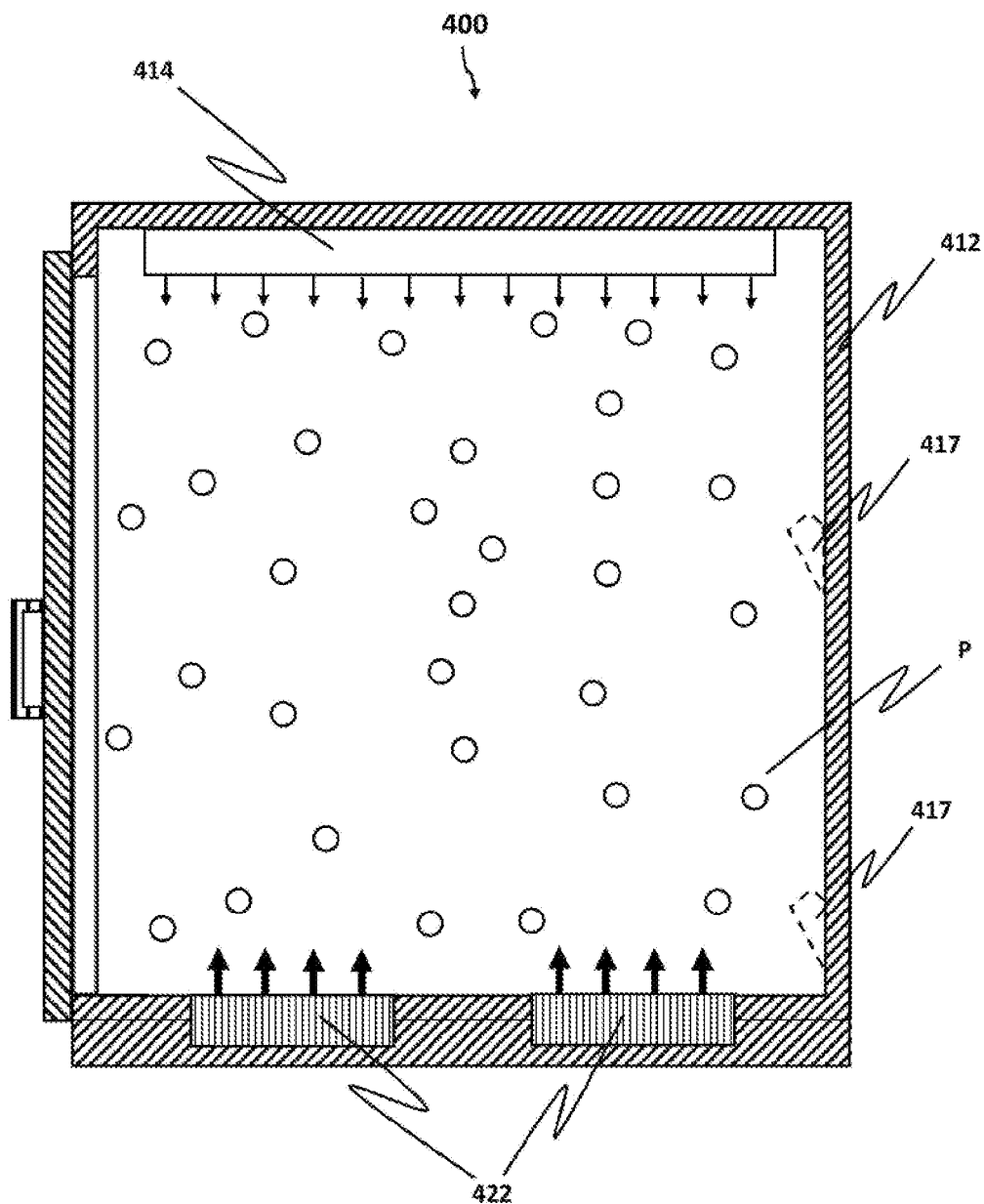
FIG. 4 illustrates Embodiment 4 of an apparatus according to the first aspect of the present invention.

FIG. 4 illustrates a specific embodiment of the apparatus according to the first aspect of the present invention. The present apparatus (400) includes: a vessel (412), which forms the plant holding unit; a flow generation mechanism (422), which generates a water or gas flow in the vessel; and an LED array (414), which forms the ultraviolet irradiation unit. It may include a liquid ejection nozzle (417) as an optional element.

The vessel (412) is capable of holding a plant in water or gas flow therein. The vessel (412) has an opening, through which the plant can be put in and out, and a door to open and close the opening. In the case in which it holds the plant in water therein, the vessel (412) also serves as a liquid holding space of the plant immersion unit.

The flow generation mechanism (422) generates an upward flow capable of floating the plant (P) accommodated in the vessel (412). The flow generation mechanism (422) is, for example, an ejection port to eject liquid or air. The ejection port (422) is provided at the bottom of the vessel in the figure, but it may also be provided on a circumferential wall.

The LED array (414) includes LED light sources to emit the ultraviolet light in the specific wavelength range. As the LED light source to emit the ultraviolet light in the specific wavelength range, two or more light sources having mutually different main peak wavelengths in the wavelength range of no less than 270 nm and no more than 290 nm may be used.

The LED array (414) is arranged in the vessel (412) on a ceiling and/or a circumferential wall to be able to irradiate the ultraviolet light in the specific wavelength range towards the inside of the vessel. The LED array (414) is provided inside the vessel (412) in the figure, but it may be provided outside the vessel (for example, with a transparent glass intervening) as long as it can irradiate the plant (P) with the ultraviolet light in the specific wavelength range.

The ejection nozzle (417) is capable of ejecting liquid or a mixture of liquid and gas. The ejection nozzle (417) is arranged in the vessel (412) to be able to eject it upward in the vessel. The ejection nozzle (417) is provided on an inner circumferential wall of the vessel (412) in the figure, but it may be alternatively or additionally provided on the ceiling and/or the floor of the vessel. Water is supplied to the ejection nozzle from a liquid supply system not illustrated in the figure, and if applicable, compressed air is also simultaneously supplied from an air supply system not illustrated in the figure. Water may contain a plant hormone and/or any other additive added thereto. In the case in which the present apparatus is used to increase the amount of a phenolic compound in a plant, a precursor of the phenolic compound to be increased may be additionally or alternatively added.

In the case in which the plant is held in water in the vessel (412), the ejection nozzle (417) to eject liquid may serve as the flow (water flow) generation mechanism (422). In the case in which the plant is held in gas flow in the vessel (412), the ejection nozzle (417) to eject a mixture of liquid and gas may serve as the flow (gas flow) generation mechanism (422).

In the apparatus (400) of the present embodiment, the plant (P) to be irradiated with the ultraviolet light in the specific wavelength range is accommodated in the vessel (412) in the lower region. Before, upon or after placing the plant (P), water is supplied to the vessel (412), thereby immersing the plant (P) in water therein. Water may contain a plant hormone and/or any other additive added thereto. In the case in which the present apparatus is used to increase the amount of a phenolic compound in the plant, a precursor of the phenolic compound to be increased may be additionally or alternatively added. Water may be supplied from the ejection nozzle (417).

The plant (P) immersed in water is floated in the vessel (412) in the ultraviolet irradiation region of the LED array (414) by the water flow generated by the flow generation mechanism (422). The plant (P) floating in water is irradiated with the ultraviolet light in the specific wavelength range from the LED array (414). The LED array (414) may continuously or intermittently irradiate the plant (P) with the ultraviolet light in the specific wavelength range.

Alternatively, the plant (P) accommodated in the vessel (412) is floated up by the gas flow generated by the flow generation mechanism (422) and floated in the ultraviolet irradiation region of the LED array (414) in the vessel (412). The plant (P) floating in the gas flow is irradiated with the ultraviolet light in the specific wavelength range from the LED array (414). The ejection nozzle (417) ejects water or a mixture of water and gas to the plant (P) under irradiation. Water may contain a plant hormone and/or any other additive added thereto. In the case in which the present apparatus is used to increase the amount of a phenolic compound in the plant, a precursor of the phenolic compound to be increased may be additionally or alternatively added. The LED array (414) may continuously or intermittently irradiate the plant (P) with the ultraviolet light in the specific wavelength range.

The apparatus (400) of the present embodiment may further include a controller (not illustrated in the figure) to collectively or individually control the LED light sources in the LED array (414). The controller may control the turning on and off of, and/or the amount of light emitted from the LED light sources to adjust the amount of irradiation from the LED array (414) to the plant (P).

Embodiment 5

Figure 5B:
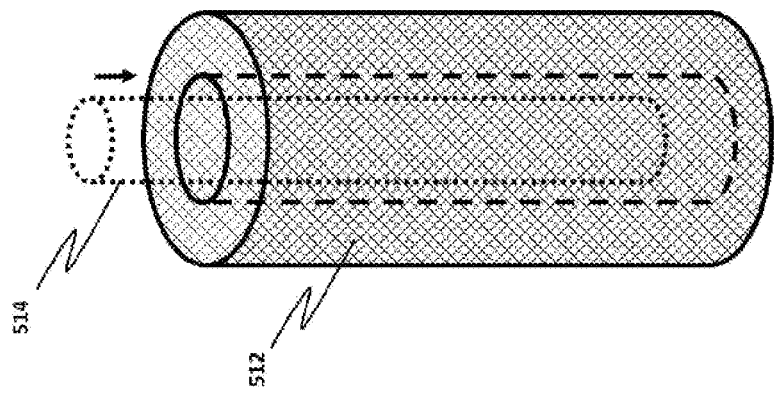
FIGS. 5A and 5B illustrate Embodiment 5 of an apparatus according to the first aspect of the present invention.
Figure 5A:
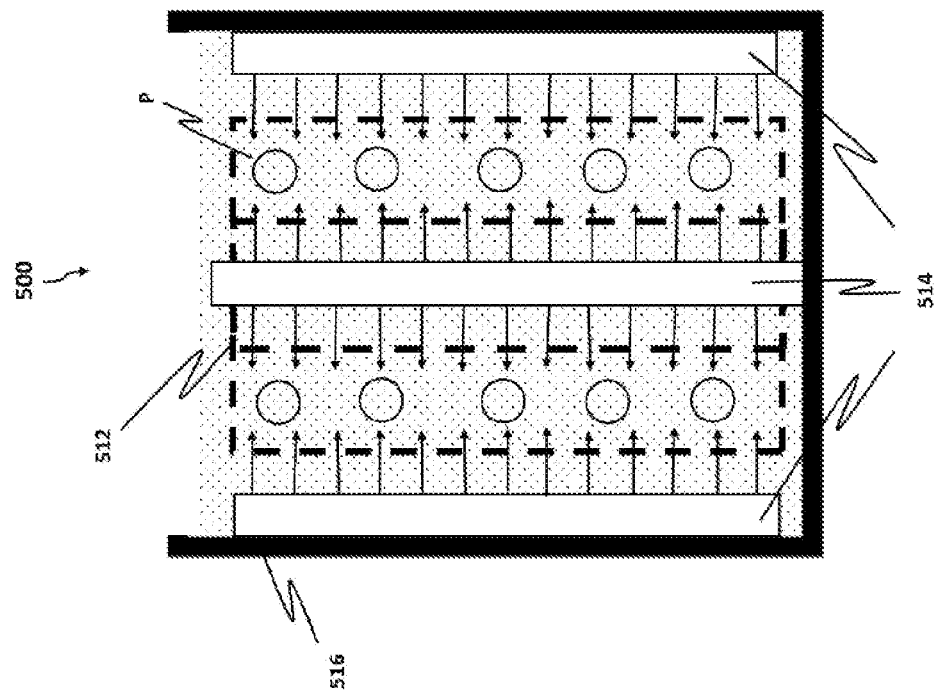

FIGS. 5A and 5B illustrate a specific embodiment of the apparatus according to the first aspect of the present invention. The present apparatus (500) includes: a basket container (512), which forms the plant holding unit; a water tank (516) capable of accommodating the basket container therein, which tank forms the plant immersion unit; and a plurality of LED arrays (514), which forms the ultraviolet irradiation unit (FIG. 5A).

As illustrated in FIG. 5B, the basket container (512) is an annular container capable of holding a plant therein and can accommodate an LED array (514) inserted in the cavity thereof. The basket container (512) has an opening, through which the plant may be put in and out, and a lid to open and close the opening on one end side in the axis direction.

The water tank (516) is capable of accommodating the basket container (512) therein and simultaneously holding liquid and stores water when used. Water may contain a plant hormone and/or any other additive added thereto. In the case in which the present apparatus is used to increase the amount of a phenolic compound in a plant, a precursor of the phenolic compound to be increased may be additionally or alternatively added.

Each of the LED arrays (514) includes LED light sources to emit the ultraviolet light in the specific wavelength range. As the LED light source to emit the ultraviolet light in the specific wavelength range, two or more light sources having mutually different main peak wavelengths in the wavelength range of no less than 270 nm and no more than 290 nm may be used. One of the LED arrays (514) has a shape (such as a cylindrical shape) capable of being inserted into the cavity of the basket container (512). This LED array (514) may be provided at the central position on the bottom of the water tank (516) before the basket container (512) is accommodated in the water tank (516), or may be provided to be inserted into the cavity of the basket container (512) after the accommodation. The rest of the LED arrays (514) are arranged on an inner circumferential surface of the water tank (516) to be able to irradiate the ultraviolet light in the specific wavelength range from the surroundings of the basket container (512).

In the apparatus (500) of this embodiment, the plant (P) to be irradiated with the ultraviolet light in the specific wavelength range is accommodated in the basket container (512). The plant (P) held in the basket container (512) is then accommodated into the water tank (516) holding water, and irradiated therein with the ultraviolet light in the specific wavelength range from the LED arrays (514) while being immersed in water. The LED array (514) may continuously or intermittently irradiate the plant (P) with the ultraviolet light in the specific wavelength range.

Although in the above description, the basket container (512) is described as the plant holding unit and the water tank (516) is described as the plant immersion unit, the water tank may be described as a vessel that is capable of holding a plant in liquid therein and that serves also as a liquid holding space of the plant immersion unit, and the basket container may be described as a plant holding member provided with the water tank.

The apparatus (500) of the present embodiment may further include a controller (not illustrated in the figure) to collectively or individually control the LED light sources in the LED arrays (514). The controller may control the turning on and off of, and/or the amount of light emitted from the LED light sources to adjust the amount of irradiation from the LED array (514) to the plant (P).

By providing a disk-shaped light guide plate at the bottom of the water vessel (516) and also substituting a cylindrical light guide plate for the LED arrays (514) on the inner circumferential surface of the water vessel (516), the light from the central LED array (514) may be guided through the bottom light guide plate to the surrounding light guide plate so that the plant (P) is irradiated with the light from the surrounding light guide plate. In this case, optical fibers may be inserted in the light guide plates to efficiently guide light to the upper part of the surrounding light guide plate. Additionally, the outer circumferential surface of the surrounding light guide plate may be covered with a reflective film to efficiently irradiate the plant (P) with light.

Also, the water tank may have a structure in which the basket container (512) is omitted and has a container-shaped external cylinder member, a transparent internal cylinder member provided at the center of the bottom of the external cylinder member, and a helical light guide plate provided between the outer and the internal cylinder members to connect the outer and the internal cylinder members. According to the configuration, a helical plant accommodating space is formed in the water tank, and by providing the LED array (514) in the internal cylinder member, the light is irradiated from the internal cylinder member to, and also through the helical light guide plate to the plant accommodating space. In the case in which the external cylinder member itself is formed of a light guide plate, the directions of irradiation to the plant may be further increased. Also in this case, optical fibers may be inserted in the light guide plate and the outer circumferential surface of the external cylinder member may be covered with a reflection film. In this case, the upper opening of the water tank may serve as a plant charging port, and the bottom of the water tank may have an opening, through which the plant is put out, and a lid therefor.

Embodiment 6

Figure 6:
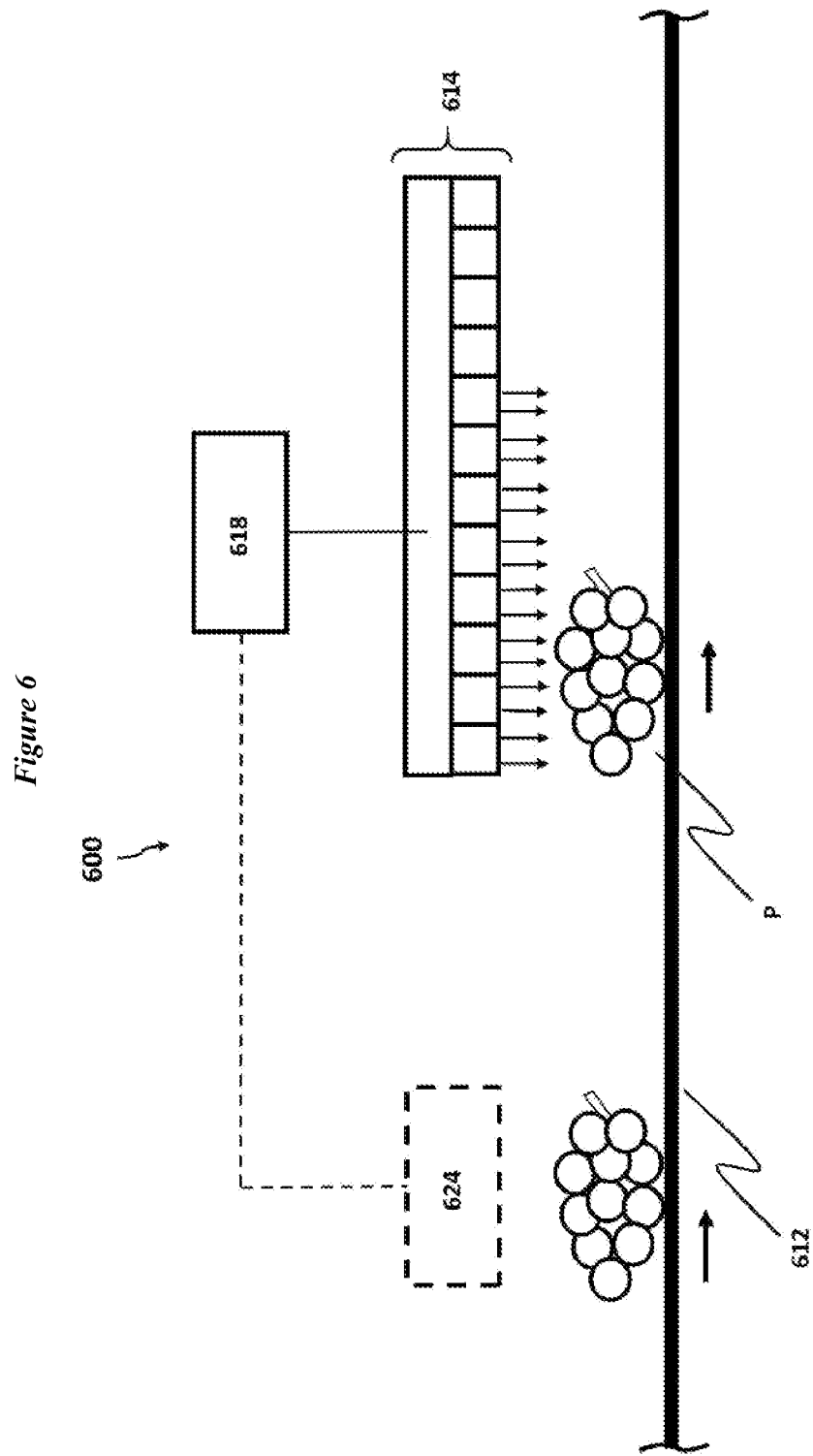
FIG. 6 illustrates Embodiment 6 of an apparatus according to the second aspect of the present invention.

FIG. 6 illustrates a specific embodiment of the apparatus according to the second aspect of the present invention. The present apparatus (600) includes: a belt conveyor (612), which forms the plant holding unit; an LED array (614), which forms the ultraviolet irradiation unit; and a controller (618), which forms the irradiation control unit. It may include a color sensor (624) as an optional element.

The belt conveyor (612) transports the plant (P) to the ultraviolet irradiation region of the LED array (614). The belt portion of the belt conveyor (612) may be a light-transmitting mesh or net belt.

The LED array (614) includes a plurality of LED light sources to emit the ultraviolet light in the specific wavelength range. Although the LED array (614) is arranged to irradiate the ultraviolet light in the specific wavelength range from the above the belt conveyor (612) in a section thereof in the figure, it may be arranged to be able to irradiate also from below, in the case in which the belt conveyor is a mesh belt conveyor.

The controller (618) receives color information of the plant (P) transported by the belt conveyor (612). The controller (618) controls the turning on and off of, and/or the amount of light emitted from the LED light sources in the LED array (614) on the basis of the received color information. The controller (618) may collectively or individually control the LED light sources in the LED array (614).

The color sensor (624) acquires the color information of the plant (P) transported by the belt conveyor (612) before the ultraviolet irradiation region of the LED array (614) (on the upstream side of the transportation) and sends said color information to the controller (618). In the case in which the present apparatus (600) does not include a color sensor, the input of color information into the controller (618) may be performed by an operator or by reading a color information code pre-assigned to the plant (P).

In the apparatus (600) of this embodiment, the plant (P) to be irradiated with the ultraviolet light in the specific wavelength range is placed on the top surface of the belt conveyor (612). The plant (P) held on the belt conveyor (612) is transported by the belt conveyor (612) to the ultraviolet irradiation region of the LED array (614), in which region it is irradiated with the ultraviolet light in the specific wavelength range from the LED array (614). The LED array (614) may continuously or intermittently irradiate the plant (P) with the ultraviolet light.

During the transportation from the placing position to the ultraviolet irradiation region, the color information of the plant (P) is input into the controller (618). The controller (618) controls the irradiation amount of the ultraviolet light in the specific wavelength range irradiated from the LED array (614) to the plant (P) on the basis of the entered color information. For example, the controller (618) increases or decreases the number of light sources to emit light among the LED light sources in the LED array (614). Alternatively, the controller (618) increases or decreases the amount of light emitted from individual LED light sources.

The present apparatus (600) may include the immersion vessel described for Embodiment 1 or the spray nozzle described for Embodiment 2. In the apparatus of the present embodiment, the immersion vessel and the spray nozzle are arranged and work as described for Embodiments 1 and 2, respectively.

Embodiment 7

FIG. 7 illustrates a specific embodiment of the apparatus according to the second aspect of the present invention. The present apparatus (700) includes: a belt conveyor (712), which forms the plant holding unit; LED arrays (714), which form the ultraviolet irradiation unit; and a controller (718), which forms the irradiation control unit. It may include a color sensor (724) as an optional element.

The belt conveyor (712) transports the plant (P) to the ultraviolet irradiation region of the LED arrays (714). The belt portion of the belt conveyor (712) may be a light-transmitting mesh or net belt.

The LED arrays (714) include three types of LED light sources having mutually different main peak wavelengths in the wavelength range of no less than 270 nm and no more than 290 nm. Although the LED arrays (714) are arranged to irradiate the ultraviolet light in the specific wavelength range from above the belt conveyor (712) in a section thereof in FIG. 7, it may be arranged to be able to irradiate also from below, in the case in which the belt conveyor is a mesh belt conveyor.

The controller (718) receives color information of the plant (P) transported by the belt conveyor (712). The controller (718) designates one (or two) of the three types of LED light sources in the LED arrays (714) to emit light on the basis of the entered color information. At the same time, the controller (718) may control the light emission amount of the LED light source(s) to emit light.

The color sensor (724) acquires the color information of the plant (P) transported by the belt conveyor (712) before the ultraviolet irradiation region of the LED arrays (714) and sends said color information to the controller (718). In the case in which the present apparatus (700) does not include a color sensor, the input of color information into the controller (718) may be performed by an operator or by reading a color information code pre-assigned to the plant (P).

In the apparatus (700) of this embodiment, the plant (P) to be irradiated with the ultraviolet light in the specific wavelength range is placed on the top surface of the belt conveyor (712). The plant (P) held on the belt conveyor (712) is transported by the belt conveyor (712) to the ultraviolet irradiation region of the LED arrays (714), in which region it is irradiated with the ultraviolet light in the specific wavelength range from the LED arrays (714). The LED arrays (714) may continuously or intermittently irradiate the plant (P) with the ultraviolet light.

During the transportation from the placing position to the ultraviolet irradiation region, the color information of the plant (P) is input into the controller (718). The controller (718) controls the wavelength of the ultraviolet light irradiated to the plant (P) from the LED arrays (714) on the basis of the entered color information.

The present apparatus (700) may include the immersion vessel described for Embodiment 1 or the spray nozzle described for Embodiment 2. In the apparatus of the present embodiment, the immersion vessel and the spray nozzle are arranged and work as described for Embodiments 1 and 2, respectively.

Embodiment 8

FIG. 8 illustrates a specific embodiment of the apparatus according to the second aspect of the present invention. The present apparatus (800) includes: a belt conveyor (812), which forms the plant holding unit; an LED array (814), which forms the ultraviolet irradiation unit; a controller, which forms the irradiation control unit; and a CCD camera (824).

The belt conveyor (812) transports the plant (P) from the sensing region of the CCD camera (824) to the ultraviolet irradiation region of the LED array (814). The belt portion of the belt conveyor (812) may be a light-transmitting mesh or net belt.

The LED array (814) includes LED light sources to emit the ultraviolet light in the specific wavelength range. The LED array (814) may include a lens system not illustrated in the figure.

The controller (818) receives input of color information of the plant transported by the belt conveyor (812) and positional information associated with the color information from the CCD camera (824). The controller (818) designates one (corresponding to the positional information) among the plurality of LED light sources in the LED array (814) to emit light on the basis of the entered color and positional information. At the same time, the controller (818) may control the light emission amount of the LED light source(s) to emit light. In the case in which the LED array (814) includes a lens system, the controller (818) also controls the lens system.

The CCD camera (824) acquires the color information of the plant (P) transported by the belt conveyor (812) and the positional information associated with the color information in the sensing region provided before the ultraviolet irradiation region of the LED array (814), and sends said information to the controller (818). Instead of the CCD camera, a CMOS camera may be used.

In the apparatus (800) of this embodiment, the plant (P) to be irradiated with the ultraviolet light in the specific wavelength range is placed on the top surface of the belt conveyor (812). The plant (P) held on the belt conveyor (812) is transported by the belt conveyor (812) to the sensing region of the CCD camera (824), in which region it is imaged by the CCD camera (824) to obtain color information and positional information associated with said color information of the plant (P), which information is sent to the controller (818). The plant (P) is then transported to the ultraviolet irradiation region of the LED array (814), in which region it is irradiated with the ultraviolet light in the specific wavelength range from the LED array (814). The controller (818) designates LED light source(s) to emit light among the LED array (814) on the basis of received positional information, and allows them to emit light at a predetermined light emission amount on the basis of the received color information. The LED array (814) may continuously or intermittently irradiate the plant (P) with the ultraviolet light.

The present apparatus (800) may include the immersion vessel described for Embodiment 1 and/or the spray nozzle described for Embodiment 2. In the apparatus of the present embodiment, the immersion vessel and the spray nozzle are arranged and work as described for Embodiments 1 and 2, respectively.

It should be noted that the above embodiments are given by way of illustration to facilitate a better understanding of the present invention, and that the present invention is not limited only to the specific configurations and arrangements described in the present specification and the attached drawings. A person skilled in the art will understand and appreciate that the specific configurations, means, methods and apparatuses described herein can be replaced with any others known in the art without departing from the spirit and scope of the present invention. It should also be noted that an aspect of the present invention described in relation to one embodiment may be incorporated into another embodiment without any specific reference thereto. In other words, all features of all and/or any embodiment may be combined in any manner and/or combination.

All scientific literatures and patent documents cited herein are incorporated herein by reference.

The patents, patent applications and other publications cited herein are deemed to be entirely incorporated herein as if the contents thereof are specifically described in the present specification by reference to the extent allowed by applicable laws.

The apparatus of the present invention is applicable for efficient production of a phenolic compound (such as a cannabinoid) that is a pharmacologically active substance from a herb plant such as a *Cannabis*.

The apparatus of the present invention is also applicable for improving the yield rate of agricultural crops.

Further, the plants (such as fruits and pericarps of grape) in which the amount of a phenolic compound (such as a polyphenol) is increased by using the apparatus of the present invention are applicable for production of high value-added and/or highly functional agricultural crops and processed food thereof (beverages such as wine).

EXPLANATION OF REFERENCES 112, 212, 312, 412, 512, 612, 712, 812: Plant holding unit
114, 214, 314, 414, 514, 614, 714, 814: Ultraviolet irradiation unit
116, 516: Plant immersion unit
217, 317, 417: Liquid ejection unit
118, 218, 618, 718, 818: Irradiation control unit
624, 724, 824: Color sensor
P: Plant in which the amount of a phenolic compound is sought to be increased by the apparatus of the present invention

The invention claimed is:

1. A plant treatment apparatus comprising:
a belt conveyor comprising a belt, the belt having an upper surface comprising a plant holding unit;
an ultraviolet irradiation unit configured to irradiate a plant held by the plant holding unit with light comprising ultraviolet light in a wavelength range of no less than 270 nm and no more than 290 nm; and
a plant immersion unit comprising a liquid holding space and configured to immerse an entirety of the plant held by the plant holding unit into a liquid held in the liquid holding space; wherein:
the belt extends continuously from a first location outside the liquid holding space to a second location inside the liquid holding space to a third location outside the liquid holding space.

2. The apparatus according to claim 1, wherein:
the ultraviolet irradiation unit is configured such that an irradiation region of the ultraviolet irradiation unit overlaps with the liquid holding space of the plant immersion unit.

3. The apparatus according to claim 1, wherein:
the ultraviolet irradiation unit is configured to irradiate the plant in the liquid holding space of the plant immersion unit with the ultraviolet light.

4. The apparatus according to claim 1, comprising:
a plant transportation mechanism comprising the plant holding unit and configured to transport the plant into an irradiation region of the ultraviolet irradiation unit and into the liquid holding space of the plant immersion unit.

5. The apparatus according to claim 1, wherein:
the belt conveyor is a mesh belt conveyor; and
the ultraviolet irradiation unit is configured to irradiate the ultraviolet light from around the mesh belt conveyor in the liquid holding space.

6. The apparatus according to claim 5, wherein:
the ultraviolet irradiation unit is configured to irradiate the plant from at least above and below the mesh belt conveyor.

7. The apparatus according to claim 5, wherein:
the ultraviolet irradiation unit comprises:
a first light source configured to emit light comprising ultraviolet light in the wavelength of no less than 270 nm and no more than 290 nm from above the mesh belt conveyor, and
a second light source configured to emit light comprising ultraviolet light in the wavelength of no less than 270 nm and no more than 290 nm from below the mesh belt conveyor.

8. The apparatus according to claim 7, wherein:
the second light source is located in the liquid holding space below the mesh belt conveyor.

9. The apparatus according to claim 7, wherein:
the first light source is located in the liquid holding space above the mesh belt conveyor; and
the second light source is located in the liquid holding space below the mesh belt conveyor.

10. The apparatus according to claim 1, further comprising:
an irradiation control unit configured to control at least one of an irradiation amount, a wavelength of the ultraviolet light, and a position irradiated with the ultraviolet light, based on color information of the plant.

11. The apparatus according to claim 1, further comprising a plant displacement mechanism configured to displace the plant so as to shift a region receiving the ultraviolet light in the plant.

12. The apparatus according to claim 1, wherein the ultraviolet irradiation unit is configured such that an amount of light in a wavelength range of no less than 310 nm and no more than 400 nm is less than 50% of the ultraviolet light emitted by the ultraviolet irradiation unit.

13. The apparatus according to claim 1, wherein the ultraviolet irradiation unit is configured such that an amount of light in a wavelength range of no less than 200 nm and no more than 260 nm is less than 20% of the ultraviolet light emitted by the ultraviolet irradiation unit.

14. The apparatus according to claim 1, wherein the ultraviolet irradiation unit comprises a light-emitting diode or a laser diode as a light source of the ultraviolet light.

15. A method comprising increasing an amount of a phenolic compound in a plant using the apparatus according to claim 1.

16. The method of claim 15, wherein the liquid comprises water and at least one agent selected from precursors of phenolic compounds or plant hormones.

17. The method according to claim 15, wherein the plant is a postharvest plant.

* * * * *